United States Patent
Takada et al.

(10) Patent No.: US 11,216,534 B2
(45) Date of Patent: Jan. 4, 2022

(54) APPARATUS, SYSTEM, AND METHOD OF COVARIANCE ESTIMATION BASED ON DATA MISSING RATE FOR INFORMATION PROCESSING

(71) Applicant: KABUSHIKI KAISHA TOSHIBA, Tokyo (JP)

(72) Inventors: Masaaki Takada, Chiba (JP); Hironori Fujisawa, Tokyo (JP); Takeichiro Nishikawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 132 days.

(21) Appl. No.: 16/296,312

(22) Filed: Mar. 8, 2019

(65) Prior Publication Data

US 2020/0073915 A1    Mar. 5, 2020

(30) Foreign Application Priority Data

Aug. 29, 2018   (JP) .............................. JP2018-160572

(51) Int. Cl.
*G06F 17/18* (2006.01)
*G06F 17/15* (2006.01)

(52) U.S. Cl.
CPC .............. *G06F 17/18* (2013.01); *G06F 17/15* (2013.01)

(58) Field of Classification Search
CPC ................................. G06F 17/15; G06F 17/18
See application file for complete search history.

(56) References Cited

U.S. PATENT DOCUMENTS

| | | |
|---|---|---|
| 7,870,083 B2 | 1/2011 | Zhu et al. |
| 8,843,423 B2 | 9/2014 | Chu et al. |
| 9,443,194 B2 | 9/2016 | Chu et al. |
| 2010/0211622 A1* | 8/2010 | Oguro ..................... G06K 9/624 708/207 |
| 2013/0226613 A1* | 8/2013 | Srinivasan ............. G06Q 50/24 705/3 |
| 2019/0294990 A1* | 9/2019 | Lopez De Prado ... G06N 7/005 |

FOREIGN PATENT DOCUMENTS

| | | |
|---|---|---|
| JP | 2015-114916 A | 6/2015 |
| JP | 2017-151497 A | 8/2017 |

OTHER PUBLICATIONS

Loh et al., "High-Dimensional Regression With Noisy and Missing Data: Provable Guarantees With Nonconvexity," The Annals of Statistics, 40:1637-64 (2012).
Datta et al., "Cocolasso for High-Dimensional Error-In-Variables Regression," arXiv:1510.07123v2, pp. 1-27 (Jan. 1, 2016).

* cited by examiner

*Primary Examiner* — Michael D. Yaary
(74) *Attorney, Agent, or Firm* — Finnegan, Henderson, Farabow, Garrett & Dunner, L.L.P.

(57) ABSTRACT

An information processing apparatus includes a data acquisition unit that acquires data including a missing value, a missing rate calculation unit that calculates a missing rate indicating a ratio of missing values included in the data, and a covariance matrix estimation unit that estimates a covariance matrix based on the missing rate. According to the information processing apparatus, since the covariance matrix is estimated based on the missing rate, the estimation accuracy of the covariance matrix can be improved.

18 Claims, 5 Drawing Sheets

APPARATUS, SYSTEM, AND METHOD OF COVARIANCE ESTIMATION BASED ON DATA MISSING RATE FOR INFORMATION PROCESSING

CROSS REFERENCE TO RELATED APPLICATIONS

This application is based upon and claims the benefit of priority from the prior Japanese Patent Application No. 2018-160572, filed on Aug. 29, 2018, the entire contents of which are incorporated herein by reference.

FIELD

Embodiments of the present invention described herein relate to an information processing apparatus, an information processing system, and an information processing method.

BACKGROUND

Missing value imputation is often performed in order to build a statistical model from high dimensional data including missing values (data with a lot of features). However, when there are many missing values or the number of dimensions is large, the amount of calculation becomes huge, or the accuracy becomes worse drastically.

Further, a method of efficiently building a statistical model without imputing missing values has been proposed. In these methods, a covariance matrix of data is estimated and a statistical model, such as a regression model, is built using it. However, when data contains many missing values, the estimation accuracy of the covariance matrix deteriorates, and as a result, the accuracy of the statistical model deteriorates.

DETAILED DESCRIPTION

According to the present embodiment, an information processing apparatus, includes:

a data acquisition unit to acquire data including a missing value;

a missing rate calculation unit to calculate a missing rate indicating a ratio of missing values included in the data; and a covariance matrix estimation unit to estimate a covariance matrix based on the missing rate.

Hereinafter, embodiments of the present invention will be described with reference to the accompanying drawings. In the embodiments described below, the characteristic configuration and operation in the information processing apparatus and the information processing system will mainly be described.

However, the information processing apparatus and the information processing system may have configurations and operations omitted from the description below.

First Embodiment

Figure 1:
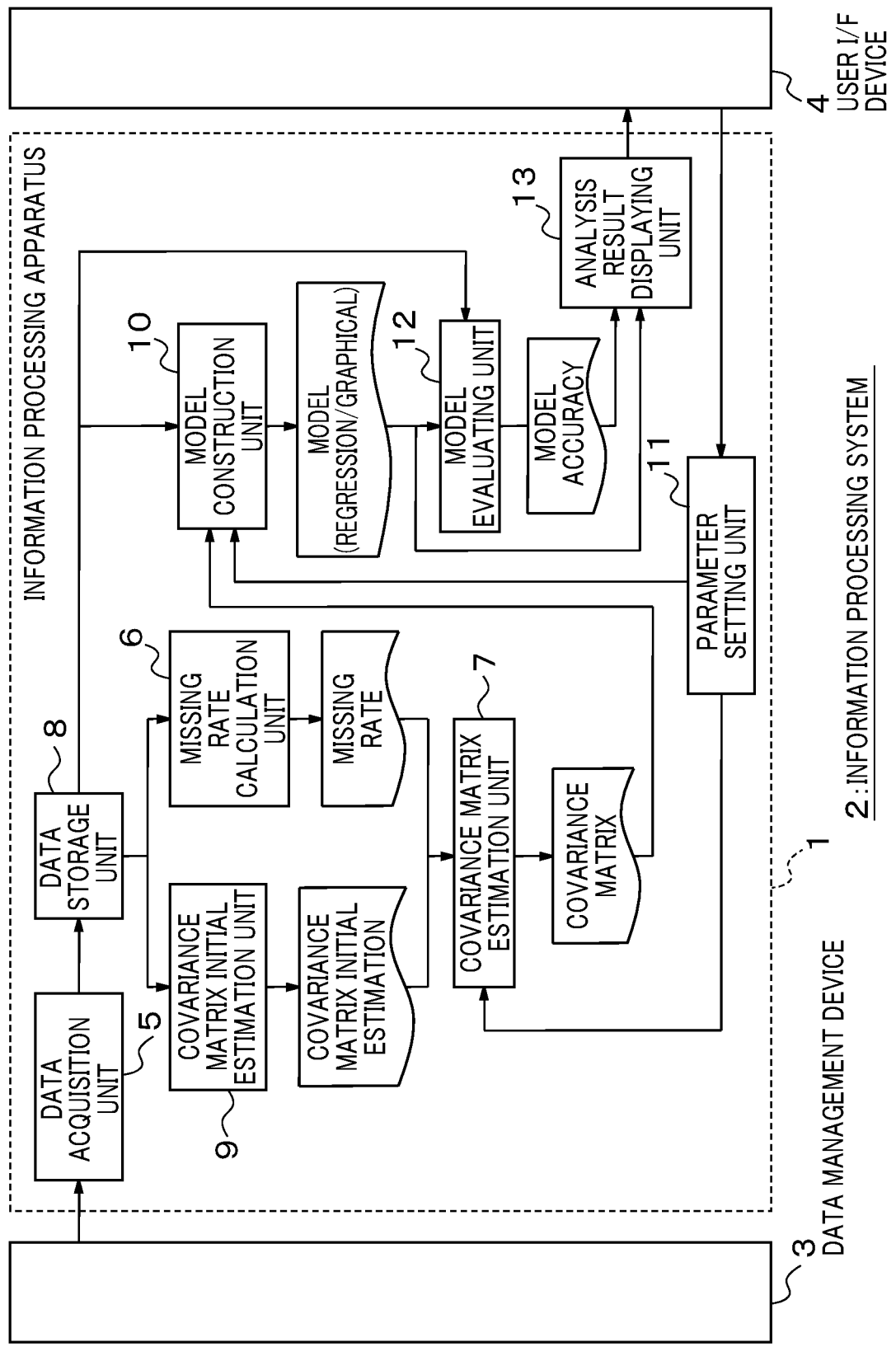
FIG. 1 is a block diagram showing a schematic configuration of an information processing system including an information processing apparatus according to a first embodiment.

FIG. 1 is a block diagram showing a schematic configuration of an information processing system 2 including an information processing apparatus 1 according to a first embodiment. The information processing system 2 in FIG. 1 includes a data management device 3, the information processing apparatus 1, and a user interface device 4.

The data management device 3 manages data used for building a statistical model. The data management device 3 has a storage unit (not shown) for storing data used for building a statistical model. The data management device 3 transmits data to the information processing apparatus 1 at a predetermined timing. When data managed by the data management device 3 is sequentially updated, the data may be transmitted to the information processing apparatus 1 in synchronization with a timing at which the data is updated. Further, the data management device 3 may transmit the data to the information processing apparatus 1 at a timing at which the user makes a request.

The information processing apparatus 1 acquires data transmitted from the data management device 3 and builds a statistical model of the data. Detailed processing operation of the information processing apparatus 1 will be described later.

The user interface device 4 provides the user with a statistical model built by the information processing apparatus 1. The way of provision is optional. For example, a statistical model may be imaged and displayed on a display unit (not shown). The information processing apparatus 1 includes a data acquisition unit 5, a missing rate calculation unit 6, and a covariance matrix estimation unit 7.

The data acquisition unit 5 acquires data including a missing value from the data management device 3. Here, the missing value indicates a data portion that cannot be acquired normally, such as when part of the data is missing. The data acquired by the data acquisition unit 5 may be stored in a data storage unit 8. The data acquisition unit 5 may perform preprocessing for analyzing data. The preprocessing may include, for example, processing such as extraction of a target period of data, extraction of target features, abnormal value processing, transforming into dummy variables, standardization, centralization, and the like. In the present embodiment, it is unnecessary to perform processing of imputing a missing value included in data. Accordingly, it is not necessary to include missing value imputation processing in the preprocessing.

The data acquired by the data acquisition unit 5 includes explanatory variable data and objective variable data.

Hereinafter, explanatory variable data X of n rows and p columns acquired by the data acquisition unit 5 is $X \in$ matrix $R^{n \times p}$, and a vector of the objective variable of n rows is $y \in R^n$. Here, n is the number of samples and p is the number of features.

The missing rate calculation unit 6 calculates a missing rate indicating a ratio of missing values included in the data. The missing rate is a value obtained by subtracting an actual measurement rate from 1. An actual measurement rate $R_\in$ matrix $R^{p \times p}$ is calculated, for example, by the following equation (1):

$$R_{jk} = \frac{n_{jk}}{n} \quad (1)$$

In Equation (1), njk is the number in which both a j-th column Xj and a k-th column Xk of X are observed, and Rjk indicates a ratio in which a pair of Xij and Xjk are both observed. Alternatively, the actual measurement rate R may be calculated as in Equation (2).

$$R_{jk} = \frac{n_j}{n} \cdot \frac{n_k}{n} \quad (2)$$

In Equation (2), nj is the number in which the j-th column Xj of X is observed. Equation (2) expresses the product of actual rates for each variable. The missing rate calculation unit 6 calculates the actual measurement rate and the missing rate.

The covariance matrix estimation unit 7 estimates a covariance matrix based on a missing rate. The covariance matrix estimation unit 7 may estimate a positive semidefinite covariance matrix or a positive definite covariance matrix based on a missing rate.

The covariance matrix estimated by the covariance matrix estimation unit 7 may be a correlation matrix. The covariance matrix estimation unit 7 can estimate the covariance matrix, for example, based on an initial estimated covariance matrix and a missing rate. A covariance matrix initial estimation unit 9 in the information processing apparatus 1 can estimate the initial estimated covariance matrix. The covariance matrix initial estimation unit 9 estimates each element of the initial estimated covariance matrix (hereinafter referred to as an initial estimate) from the missing data. In the present description, an initial estimate of a covariance matrix is represented by a symbol shown in Equation (3) (for convenience sake, referred to as sigma hat).

$$\hat{\Sigma} \in R^{p \times p} \quad (3)$$

The covariance matrix initial estimation unit 9 estimates an initial estimate which is each element of an initial estimated covariance matrix by Equation (4) described below.

$$\hat{\Sigma}_{jk} = \frac{1}{n_{jk}} \sum_{i \in I_{jk}} (X_{ij} - \overline{X_j})(X_{ik} - \overline{X_k}) \quad (4)$$

In Equation (4), Ijk is a set of row numbers i where both Xij and Xjk are observed, njk is the number of elements of Ijk, and an Xj bar and an Xk bar are an average value of X in j-th and k-th columns in Ijk.

Equation (4) is called a pair-wise covariance matrix because it calculates a covariance matrix using an observed variable pair. In addition to Equation (4), a covariance matrix (called a list-wise covariance matrix) using only a sample for which all the variables are observed may be calculated. Alternatively, a covariance for variables involving missing may be replaced with zero.

Further, a normal covariance matrix may be calculated from data in which a missing value is replaced with a representative value, such as an average value or a median value. Further, a matrix approximated to an identity matrix or a zero matrix may be used for the initial estimate obtained above. The covariance matrix initial estimation unit 9 can estimate the initial estimate of a covariance matrix.

The covariance matrix estimation unit 7 solves, for example, an optimization problem of Equation (5) using the initial estimate which is each element of the initial estimated covariance matrix and the missing rate, so as to obtain the covariance matrix.

$$\tilde{\Sigma} = \operatorname{argmin}_{\Sigma \geq 0} \|R \cdot (\Sigma - \hat{\Sigma})\|_F^2 \quad (5)$$

As shown in Equation (5), the covariance matrix estimation unit 7 estimates the covariance matrix so as to minimize a distance to the initial estimated covariance matrix. More specifically, the covariance matrix estimation unit 7 estimates the covariance matrix so as to minimize the sum of squares of values obtained by multiplying a difference between each element of the covariance matrix and a corresponding element of the initial estimated covariance matrix by the actual measurement rate. That is, the covariance matrix estimation unit 7 estimates the covariance matrix so as to minimize a value obtained by multiplying a difference between each element of the covariance matrix and a corresponding element of the initial estimated covariance matrix by a value of a power of a value obtained by subtracting the missing rate from 1, and adding together the obtained values.

In Equation (5), "$\| \|_F$" is the Frobenius norm of a matrix and represents the square root of the sum of the squares of each element. Further, "•" represents the product (Hadamard product) for each element. Further, $\Sigma \geq 0$ represents a constraint condition that $\Sigma$ is a positive semidefinite matrix. Instead of the Frobenius norm, a max norm and a likelihood distance may be used. As a norm that is adaptive to the missing rate, weighting may be applied with a matrix that takes the power of each component of R, or weighting may further be applied with a complex function form. The constraint condition of a positive semidefinite matrix may be a positive definite matrix or a constraint condition based on a condition number, an eigenvalue, or a singular value. The above optimization problem can be solved by using the Alternating Direction Method of Multipliers (ADMM) or the like.

If R is a matrix of all elements being 1 and the norm is a max norm, the above optimization problem and subsequent processing flow are consistent with existing CoCoLasso. In the case of CoCoLasso, the missing rate is not taken into consideration. For this reason, when a high missing variable exists, its covariance value causes the estimation accuracy of the covariance matrix to be deteriorated. On the other hand, in the present embodiment, since the missing rate is taken into consideration, even in the presence of a variable with a high missing rate, the variable hardly affects the covariance matrix estimation, and the covariance matrix estimation accuracy can be maintained. That is, CoCoLasso is weak against data with high missing rates, and the present embodiment has a characteristic that it is strong against data with high missing rates.

A covariance matrix estimated by the covariance matrix estimation unit 7 can be used to build a statistical model. The construction of the statistical model is performed by a model construction unit 10 of the information processing apparatus 1 in FIG. 1. The model construction unit 10 performs, for example, regression modeling using an estimated covariance matrix.

The regression equation is expressed by Equation (6), for example.

$$\hat{y} = X\beta \quad (6)$$

For example, by solving the optimization problem of Equation (7) below, an estimated value β hat of the regression model indicated by Equation (6) is estimated.

$$\hat{\beta} = \mathrm{argmin}_\beta 1/2\ \beta^T \hat{\Sigma}\beta - \rho^T\beta + \lambda\|\beta\|_1 \quad (7)$$

In the equation, "$\|\ \|_1$" is an L1 norm. Equation (7) is equivalent to a Least Absolute Shrinkage and Selection Operator (Lasso) when X is complete data without missing values. As with Lasso, the above optimization problem can be solved using a Coordinate Descent Algorithm (CDA) or the like. Also, ρ in Equation (7) is a covariance vector of X and y, and when a missing value is included, it is calculated as shown in Equation (8) below using only measured values for each pair.

$$\rho_j = \frac{1}{n_j} \sum_{i \in I_j} y_i (X_{ij} - \overline{X}_j) \quad (8)$$

where $I_j$ is a set of row numbers i on which $X_{ij}$ is observed, $n_j$ is the number of elements of $I_j$, and an $\overline{X}_j$ bar is an average value of X in a j-th column in $I_j$. As a method of calculating the covariance vector ρ, another method similar to the initial estimate Σ hat of the covariance matrix may be used.

Also, even if missing is included in y, it can be calculated in a method similar to that for the initial estimate Σ hat of the covariance matrix.

The estimation of the covariance matrix by the covariance matrix estimation unit 7 and the construction of the regression model by the model construction unit 10 may be optimized at the same time instead of being optimized separately.

In Equation (7), λ is a tuning parameter called a regularization parameter. Tuning of λ is performed, for example, using cross validation. The cross validation employs a parameter by which a best error can be obtained in validation data. In the cross validation, in a case where missing values are included in the validation data when calculating an error of the validation data, the validation data is complemented in some way, or the covariance matrix of the validation data is estimated by a method similar to the covariance matrix estimation method described in the present embodiment. In this manner, the error of the validation data is estimated.

In addition, the information processing apparatus 1 of FIG. 1 may include a parameter setting unit 11, a model evaluating unit 12, and an analysis result displaying unit 13.

The parameter setting unit 11 sets parameters to be used when the covariance matrix estimation unit 7 estimates the covariance matrix and parameters used when the model construction unit 10 builds the regression model. The parameters used in estimating the covariance matrix include a threshold of a minimum eigenvalue of the covariance matrix, a maximum number of repetitions in optimization, and the like. The parameters used in building the regression model include a search range of the regulariiation parameter and the number of searches.

The model evaluating unit 12 evaluates the accuracy of the built regression model. The accuracy of the regression model is measured by using the test data based on a performance metric, for example, such as a mean square error, a root mean square error, a coefficient of determination, an adjusted coefficient of determination, and the like.

The analysis result displaying unit 13 displays an analysis result of the built regression model. The analysis results include a regression coefficient of the regression model, the degree of importance of each variable, transition of an important variable, the accuracy of the regression model, a scatter diagram of a predicted value and an observed value of the regression model, a change in the accuracy of the regression model at each parameter, and the like. The analysis result displaying unit 13 may display an analysis result on a display unit in the information processing apparatus 1 or may send the analysis result to the user interface device 4 and display the analysis result on a display unit in the user interface device 4. Further, the analysis result may be stored in the data management device 3.

Figure 2:
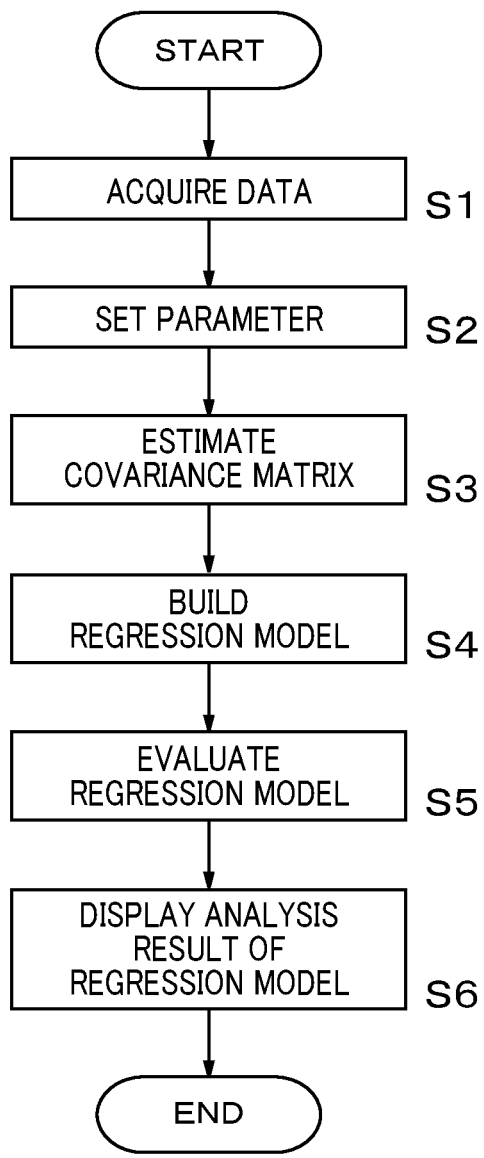
FIG. 2 is a flowchart showing an example of processing operation of the information processing apparatus of FIG. 1.

FIG. 2 is a flowchart showing an example of processing operation of the information processing apparatus 1 of FIG. 1. First, the data acquisition unit 5 acquires data (Step S1). Next, the parameter setting unit 11 sets various parameters used by the covariance matrix estimation unit 7 and the model construction unit 10 (Step S2). Next, the covariance matrix estimation unit 7 estimates a covariance matrix (Step S3). Next, the model construction unit 10 builds a regression model (Step S4). Next, the model evaluating unit 12 evaluates the regression model (Step S5). Next, an analysis result of the regression model is displayed on the analysis result displaying unit 13 (Step S6).

Figure 3:
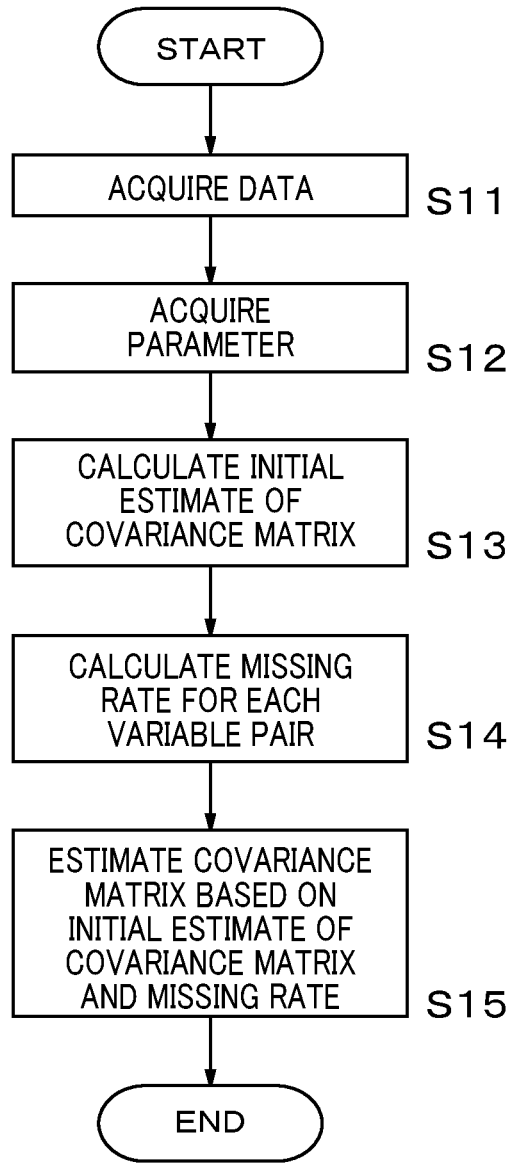
FIG. 3 is a flowchart showing an example of detailed processing operation in Step S3 of FIG. 2.

FIG. 3 is a flowchart showing an example of detailed processing operation in Step S3 of FIG. 2. First, data is acquired from the data acquisition unit 5 (Step S11). Next, parameters to be used for estimating the covariance matrix are acquired from the parameter setting unit 11 (Step S12). Next, based on the acquired data and parameters, the covariance matrix initial estimation unit 9 calculates an initial estimate of the covariance matrix (Step S13). Next, the missing rate calculation unit 6 calculates a missing rate for each variable pair (Step S14). Next, the covariance matrix estimation unit 7 estimates the covariance matrix based on the initial estimate of the covariance matrix and the missing rate (Step S15).

Figure 4:
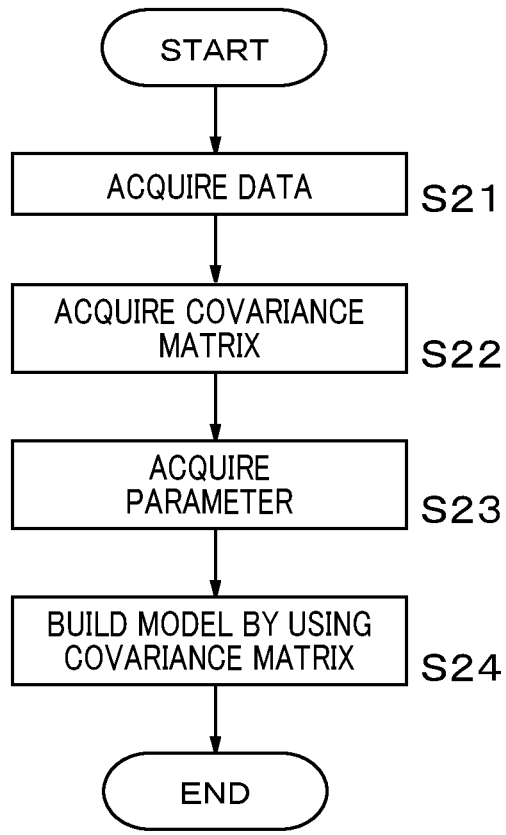
FIG. 4 is a flowchart showing an example of detailed processing operation of Step S4 of FIG. 2.

FIG. 4 is a flowchart showing an example of detailed processing operation of Step S4 in FIG. 2. First, data is acquired from the data acquisition unit 5 (Step S21). Next, a covariance matrix is acquired from the covariance matrix estimation unit 7 (Step S22). Next, parameters to be used for building a regression model are acquired from the parameter setting unit 11 (Step S23). Next, the model construction unit 10 builds a regression model using the covariance matrix (Step S24).

Figure 5:
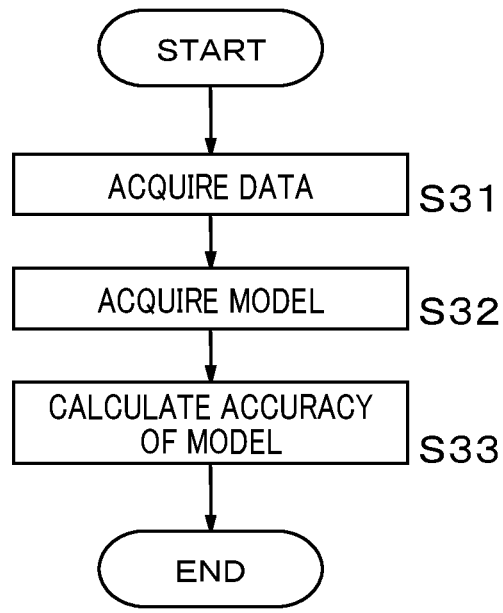
FIG. 5 is a flowchart showing an example of detailed processing operation in Step S5 of FIG. 2.

FIG. 5 is a flowchart showing an example of detailed processing operation of Step S5 in FIG. 2. First, data is acquired from the data acquisition unit 5 (Step S31). Next, a regression model is acquired from the model construction unit 10 (Step S32). Next, the model evaluating unit 12 calculates the accuracy of the regression model (Step S33).

As described above, in the first embodiment, since the covariance matrix is estimated based on the missing rate, the estimation accuracy of the covariance matrix can be improved. More specifically, the covariance matrix is estimated on the basis of a value obtained by weighting a difference between each element of the covariance matrix and each element of the initially set covariance matrix according to the missing rate. Accordingly, even for high dimensional and data with high missing rates, estimation accuracy of the covariance matrix can be improved. Since the regression model is built on the basis of the estimated covariance matrix, the accuracy of the regression model can be improved even for high dimensional and data with high missing rates.

Second Embodiment

In the first embodiment, an example of building a regression model based on the covariance matrix is described. In a second embodiment, a graphical model is built based on the covariance matrix.

Since the information processing apparatus 1 and the information processing system 2 according to the second embodiment are configured in a similar manner as in FIG. 1, a difference from the first embodiment will be mainly described below.

In the information processing apparatus 1 according to the second embodiment, the processing operation of the model construction unit 10 is different from that in the first embodiment. The model construction unit 10 according to the second embodiment performs graphical modeling based on the covariance matrix estimated by the covariance matrix estimation unit 7 to build a graphical model. The estimated value θ hat of the graphical model $\theta \in$ matrix $R_{p \times p}$ is expressed by Equation (9) below, where det is a determinant and tr is a trace.

$$\hat{\theta} = \mathrm{argmin}_\theta - \log\ \det(\theta) + tr(\tilde{\Sigma}\theta) + \lambda \|\theta\|_1 \qquad (9)$$

Further, λ is a tuning parameter called a regularization parameter. If data X is complete data with no missing value, it is equivalent to Graphical Lasso and the above optimization problem can be solved by a method similar to that with Graphical Lasso.

The model evaluating unit 12 according to the second embodiment evaluates the graphical model using, for example, likelihood, log likelihood, variation based on bootstrap, and the like.

Figure 6:
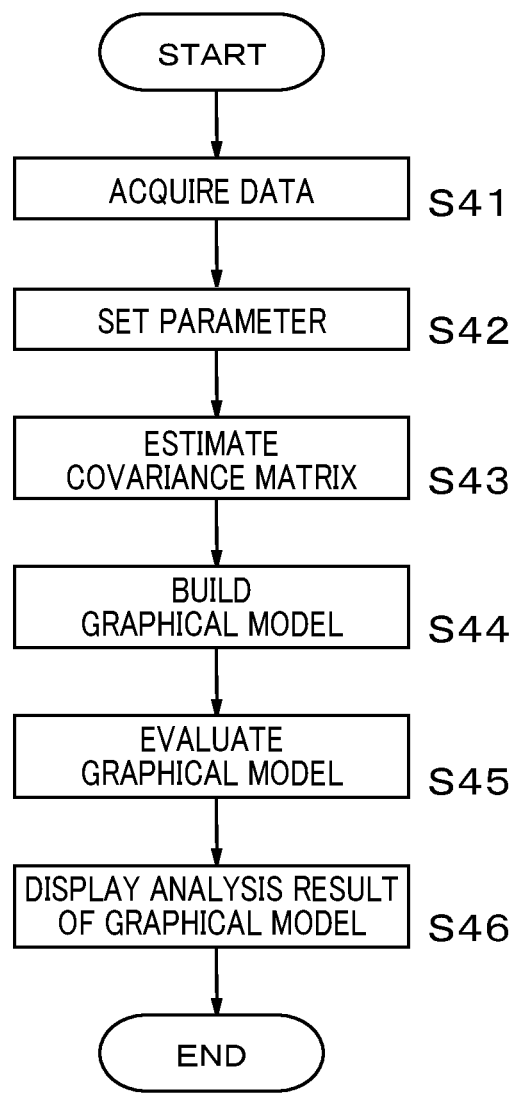
FIG. 6 is a flowchart showing processing operation of the information processing apparatus according to a second embodiment.

FIG. 6 is a flowchart showing processing operation of the information processing apparatus 1 according to the second embodiment.

Steps S41 to S43 in FIG. 6 are similar to Steps S1 to S3 in FIG. 2. Based on the covariance matrix estimated in Step S43, the model construction unit 10 builds a graphical model according to Equation (9) (Step S44). Next, the model evaluating unit 12 evaluates the built graphical model (Step S45). Next, the analysis result displaying unit 13 displays an analysis result of the built graphical model (Step S46).

As described above, in the second embodiment, since the graphical model is built using the covariance matrix estimated based on the missing rate, the accuracy of the graphical model can be improved.

At least part of the information processing apparatus 1 and the information processing system 2 described in the above embodiments may be configured by hardware or software. In a case of software configuration, a program that implements at least part of functions of the information processing apparatus 1 and the information processing system 2 may be stored in a recording medium, such as a flexible disk or a CD-ROM, and read and executed by a computer. The recording medium is not limited to a detachable one such as a magnetic disk and an optical disk, but may be a fixed type recording medium such as a hard disk device or a memory.

Further, a program for obtaining at least part of functions of the information processing apparatus 1 and the information processing system 2 may be distributed via a communication line (including wireless communication) such as the Internet. Furthermore, the program in an encrypted, modulated, or compressed state may be distributed over a wired line, such as the Internet, or a wireless line, or stored in a recording medium for distribution.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing apparatus, comprising processing circuitry configured to:
    acquire data including a plurality of missing values;
    estimate a first covariance matrix based on the data including the plurality of missing values;
    calculate a missing rate indicating a ratio of the plurality of missing values included in the data compared to actual measurements;
    estimate a second covariance matrix based on the missing rate and the data including the plurality of missing values;
    build a statistical model, based on the second covariance matrix, that generates a predicted value based on the data including the plurality of missing values; and
    display, via a user interface device, the predicted value from the statistical model,
    wherein the second covariance matrix is estimated based on a value obtained by weighting a difference between elements of the second covariance matrix and the corresponding elements of the first covariance matrix in accordance with the missing rate.

2. The information processing apparatus according to claim 1, wherein a positive semidefinite covariance matrix or a positive definite covariance matrix is estimated based on the missing rate.

3. The information processing apparatus according to claim 1, wherein the second covariance matrix is a correlation matrix.

4. The information processing apparatus according to claim 1, where the second covariance matrix is estimated so as to minimize a distance between the second covariance matrix and the first covariance matrix.

5. The information processing apparatus according to claim 4, wherein the first covariance matrix is estimated using a pair-wise covariance matrix or a list-wise covariance matrix.

6. The information processing apparatus according to claim 4, wherein a Frobenius norm, max norm, or likelihood distance weighted according to the missing rate is used as the distance.

7. The information processing apparatus according to claim 4, wherein the second covariance matrix is estimated so as to minimize a value obtained by multiplying a difference between each element of the second covariance matrix and a corresponding element of the first covariance matrix by a value of a power of a value obtained by subtracting the missing rate from 1, and adding together the obtained values.

8. The information processing apparatus according to claim 1, wherein the statistical model is a regression model or a graphical model.

9. An information processing system, comprising:
a data management device to manage data used for building a statistical model;
an information processing apparatus to build the statistical model based on the data; and
a user interface device to provide the statistical model to the user, wherein the information processing apparatus comprises processing circuitry configured to:
acquire the data including a plurality of missing values;
estimate a first covariance matrix of the data including the plurality of missing values;
calculate a missing rate indicating a ratio of the plurality of missing values included in the data compared to actual measurements;
estimate a second covariance matrix based on the missing rate and the data including the plurality of missing values;
build the statistical model, based on the second covariance matrix, that generates a predicted value based on the data including the plurality of missing values; and
display, via the user interface device, the predicted value from the statistical model,
wherein the second covariance matrix is estimated based on a value obtained by weighting a difference between elements of the second covariance matrix and the corresponding elements of the first covariance matrix in accordance with the missing rate.

10. The information processing system according to claim 9, wherein a positive semidefinite covariance matrix or a positive definite covariance matrix is estimated based on the missing rate.

11. The information processing system according to claim 9, wherein the second covariance matrix is a correlation matrix.

12. The information processing system according to claim 9, wherein the second covariance matrix is estimated so as to minimize a distance between the second covariance matrix and the first covariance matrix.

13. The information processing system according to claim 12, wherein the first covariance matrix is estimated using a pair-wise covariance matrix or a list-wise covariance matrix.

14. The information processing system according to claim 12, wherein a Frobenius norm, max norm, or likelihood distance weighted according to the missing rate is used as the distance.

15. The information processing system according to claim 12, wherein the second covariance matrix is estimated so as to minimize a value obtained by multiplying a difference between each element of the second covariance matrix and a corresponding element of the first covariance matrix by a value of a power of a value obtained by subtracting the missing rate from 1, and adding together the obtained values.

16. The information processing system according to claim 9, wherein the statistical model is a regression model or a graphical model.

17. An information processing method of causing a computer to execute the steps of:
acquiring data including a plurality of missing values;
estimating a first covariance matrix of the data including the plurality of missing values;
calculating a missing rate indicating a ratio of the plurality of missing values included in the data compared to actual measurements;
estimating a second covariance matrix based on the missing rate and the data including the plurality of missing values;
building a statistical model, based on the second covariance matrix, that generates a predicted value based on the data including the plurality of missing values; and
displaying, via a user interface device, the predicted value from the statistical model,
wherein the second covariance matrix is estimated based on a value obtained by weighting a difference between elements of the second covariance matrix and the corresponding elements of the first covariance matrix in accordance with the missing rate.

18. The information processing method according to claim 17, wherein the estimating of the second covariance matrix comprises estimating a positive semidefinite covariance matrix or a positive definite covariance matrix based on the missing rate.

* * * * *